United States Patent [19]

Maruyama et al.

[11] Patent Number: 4,639,187
[45] Date of Patent: Jan. 27, 1987

[54] AUTOMATIC STORING EQUIPMENT

[75] Inventors: Asao Maruyama; Kohzo Miyagawa, both of Osaka, Japan

[73] Assignee: Tsubakimoto Chain Co., Japan

[21] Appl. No.: 630,951

[22] Filed: Jul. 16, 1984

[51] Int. Cl.$^4$ .............................................. B65G 1/06
[52] U.S. Cl. ................................ 414/787; 198/465.1; 324/158 F; 414/280; 414/286
[58] Field of Search ............... 414/277, 280, 281, 282, 414/283, 286, 787, 661-663, 659; 324/158 F; 191/1 R, 2-4; 108/51.1; 198/465.1

[56] References Cited

U.S. PATENT DOCUMENTS

| | | | |
|---|---|---|---|
| 3,724,688 | 4/1973 | Atwater | 414/282 |
| 3,738,506 | 6/1973 | Cornford et al. | 414/283 |
| 4,285,233 | 8/1981 | Swis | 198/465.1 X |
| 4,389,157 | 6/1983 | Bernard et al. | 414/787 |
| 4,450,400 | 5/1984 | Gwyn | 414/281 X |

Primary Examiner—Joseph E. Valenza
Assistant Examiner—David A. Bucci
Attorney, Agent, or Firm—Darby & Darby

[57] ABSTRACT

An automatic storing equipment which is provided with a carrousel having a number of sheives and capable of automatically storing or taking out articles, such as electronic instruments, onto or from the predetermined shelf and which comprises pallets for carrying thereon the article, carrousel for storing therein the pallets with articles thereon, and a loading/unloading machine for storing or taking out the article onto or from the carrousel enables continuous power-feeding from the storing action to taking out action for the articles by means of characteristic construction. Hence, in a case that an electronic instrument mounted a microcomputer is the object to be stored, the object stored onto the shelves can be continuously energized to execute the programs loaded prior to the storing, thereby enabling perfect automatization of storing and taking out work for the continuous ageing test.

16 Claims, 13 Drawing Figures

AUTOMATIC STORING EQUIPMENT

BACKGROUND OF THE INVENTION

1. Field of the Invention

This invention relates to an automatic storing equipment for housing many articles onto shelves respectively and automatically storing or taking out each article onto or from each shelf.

2. Description of the Prior Art

The continuous energization test (ageing test) for quality assurance is indispensable for electrical products or electronic equipments, such as a printer or a floppy disk drive unit. However, the continuous ageing test takes much time and it is troublesome to supervise specimens individually with time, so that all the specimens to be subjected to the continuous ageing test are generally stored in position and subjected to the test all at once, whereby the continuous ageing test has been very inefficient.

The electronic equipment mounted a micro-computer is performable of the predetermined test-operation or of self-checking so that such operation may remarkably improve the efficiency of continuous ageing test, but in order to execute the program, the power feeding should be kept uninterrupted after loading the program. Hence, the program is loaded to the object to be tested and should be carried out at a place where the continuous ageing test is performable and the continuous energization for the predetermined time at the input place. As a result, the continuous ageing test for electronic equipments has been very inefficient and the automatization of storing or taking out the specimen onto or from the shelf for the continuous ageing test has been very difficult.

OBJECTS OF THE INVENTION

In the light of the above problem, this invention has been designed. A first object of the invention is to provide an automatic storing equipment which is capable of ensuring automatic storing of articles onto the predetermined shelves, or automatic taking out of the same therefrom.

A second object of the invention is to provide an automatic storing equipment free from interruption of power feeding to the article even when the articles are stored or taken out onto or from the shelves as well as when they are stored therein respectively.

A third object of the invention is to provide an automatic storing equipment which is capable of moving the articles stably and reliably when stored or taken out onto or from the shelves.

A fourth object of the invention is to provide an automatic storing equipment which is capable of preventing damage in members operating for storing or taking out the articles onto or from the shelves respectively.

A fifth object of the invention is to provide an automatic storing equipment which is capable of ensuring the procedure for storing or taking out the articles onto or from the shelves to thereby prevent a malfunction.

A sixth object of the invention is to provide an automatic storing equipment which is capable of lifting or lowering the articles stably and safely when the article is stored or taken out onto or from the shelves respectively.

The above and further objects and features of the invention will more fully be apparent from the following detailed description with accompanying drawings.

DETAILED DESCRIPTION OF THE INVENTION

Figure 1:
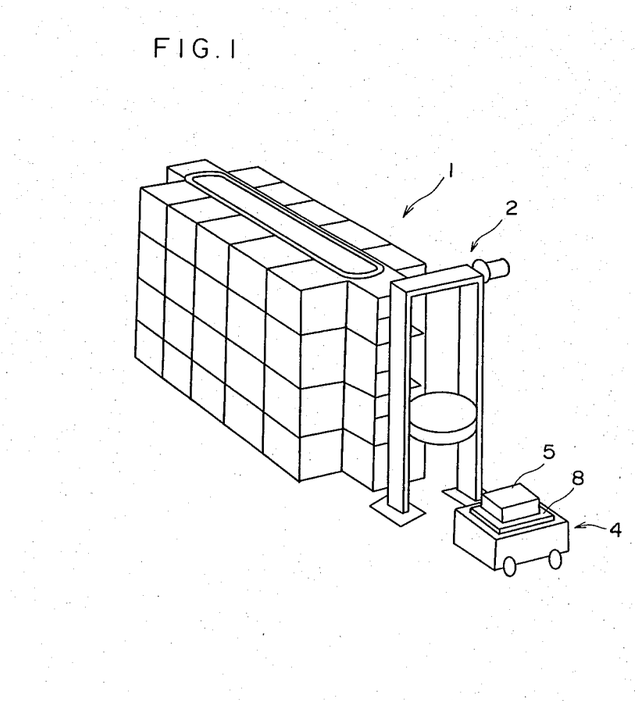
FIG. 1 is a schematic perspective view of an embodiment of an automatic storing equipment of the invention.
Figure 2:
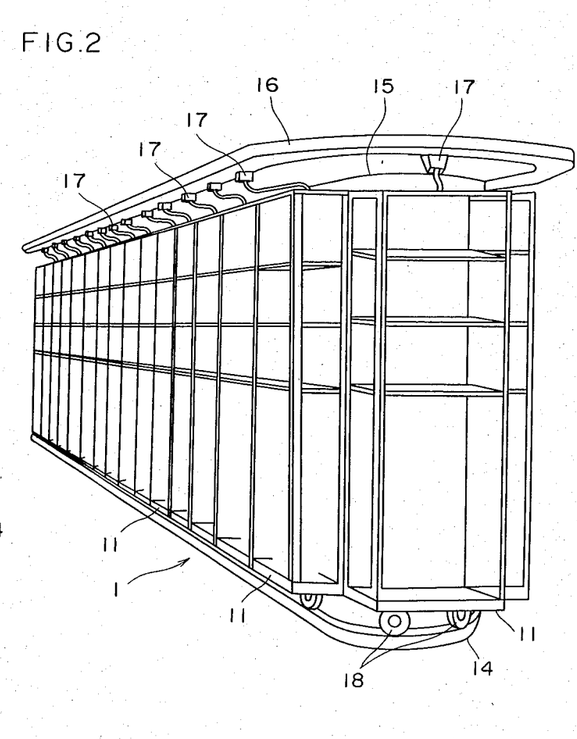
FIG. 2 is an external view of a carrousel at the automatic storing equipment of the invention.
Figure 3:
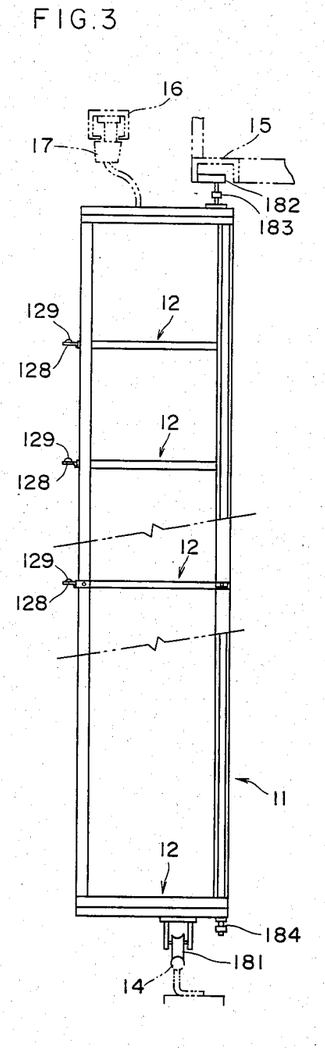
FIG. 3 is a side view of the carrousel.
Figure 4:
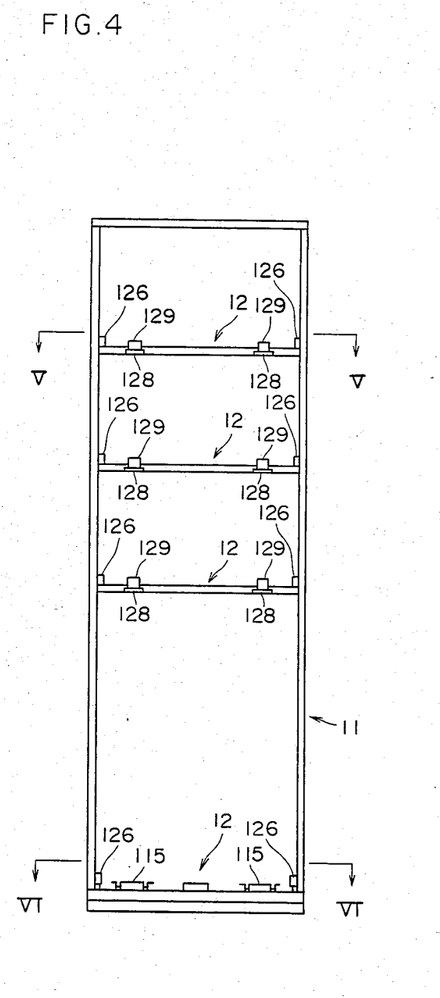
FIG. 4 is a partially schematic front view thereof.
Figure 5:
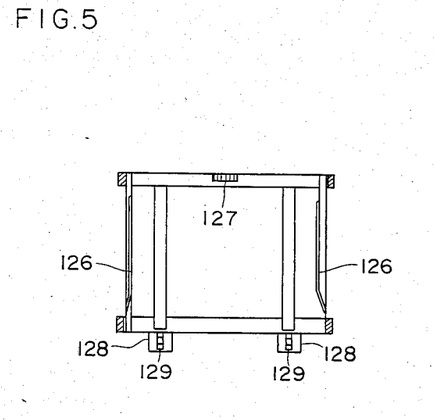
FIG. 5 is a sectional view taken on the line V—V in FIG. 4.
Figure 6:
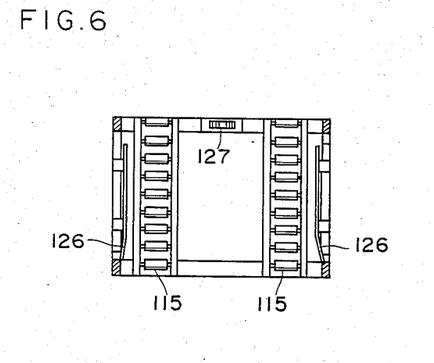
FIG. 6 is a sectional view taken on the line VI—VI in FIG. 4.

An embodiment of an automatic storing equipment of the invention in general is shown in FIG. 1, in which reference numeral 1 designates an assembly of rotary movable carrousel of multitiered and multirow type. A loading/unloading machine 2 is disposed at the article storing or taking out position of each shelf, a specimen of printer 5 being put on a pallet 8 and conveyed by a cart 4. The printer 5 mounts a microcomputer system, whose memory is given a program for test operation by an operator after the printer 5 is loaded on the loader-/unloader 2 and energized, the pallet 8 carrying the printer 5 is stored; on the predetermined shelf at the carrousel 1 by the loader/unloader 2 and the printer 5 is subjected to the continuous ageing test at the stored position for the predetermined time, testing whether or not the printer 5 operates normally, thereafter it is taken out from the shelf and conveyed by the cart 4 toward a predetermined place.

Referring to FIGS. 2, 3, 4, 5 and 6, the carrousel 1 comprises a number of shelf row 11, juxtaposed widthwise and mounted at the upper and lower surfaces to endless chains 183 and 184 extending above and below the shelf rows 11 respectively. Pairs of guide rollers 182 and 181 are mounted onto the upper and lower surfaces of each shelf row 11,11, the endless chains 183 and 184 circulating to move each shelf row 11 in circulation along the endless upper and lower guide rails 15 and 14, the upper guide rail 15 providing at the outside thereof an endless conductive rail 16, on which current collectors 17,17 are slidably mounted to carry out power feeding to each shelf row 11.

Each shelf row 11 is provided with four shelves 12,12, the lowermost shelf 12 being larger in space thereabove to enable storing of a specimen of large size, three shelves 12,12 being smaller and for storing small-sized specimens respectively. Each shelf 12 is provided at both lateral ends with pallet guide 126,126 extending longitudinally of shelf 12 and each bent at the front end outwardly, and at the center of rear side with a power feeding part 127 engageable with a power-receiving unit at the pallet 8 to be discussed below, thereby feeding the pallet 8 through the conductor rail 16 and current collecter 17. Also, two rows of roller conveyors 115,115 are provided at the surface of bottom of lowermost shelf 12 and extend longitudinally thereof to facilitate storage of a large-sized specimen, each of three upper shelves 12, 12 being provided at the front end with a pair of stoppers for the pallet 8 which has leaf springs 129 on tilted plates 128 respectively.

Figure 7:
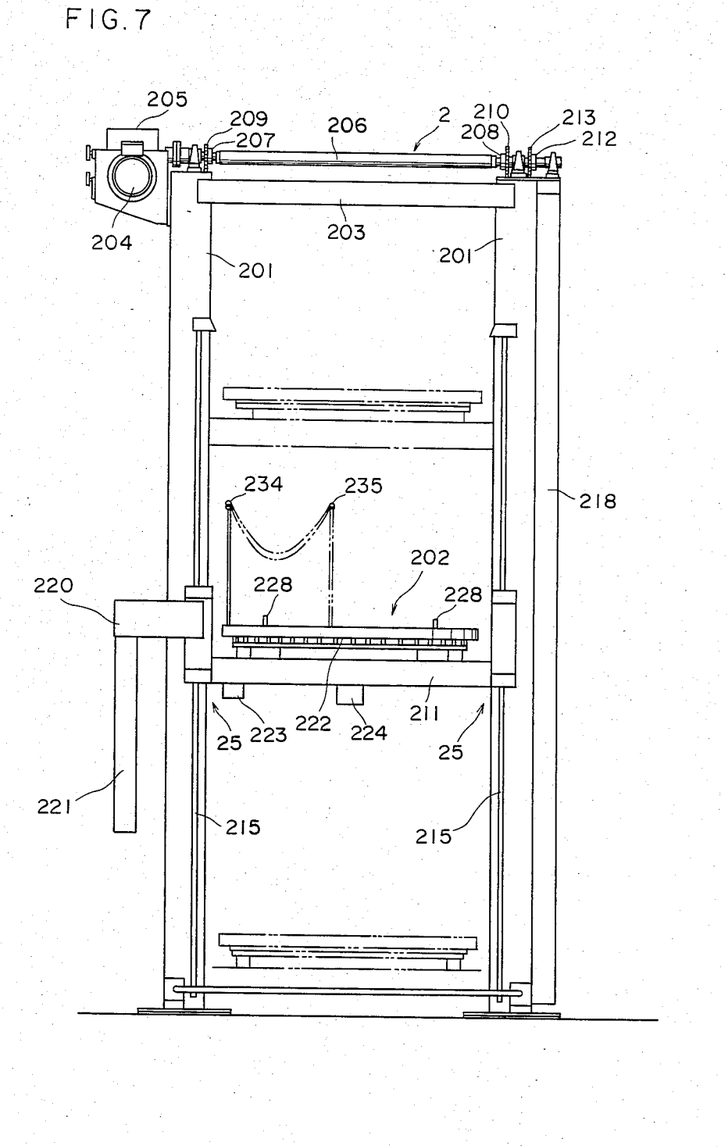
FIG. 7 is a schematic front view of a loading/unloading machine of the invention.
Figure 8:
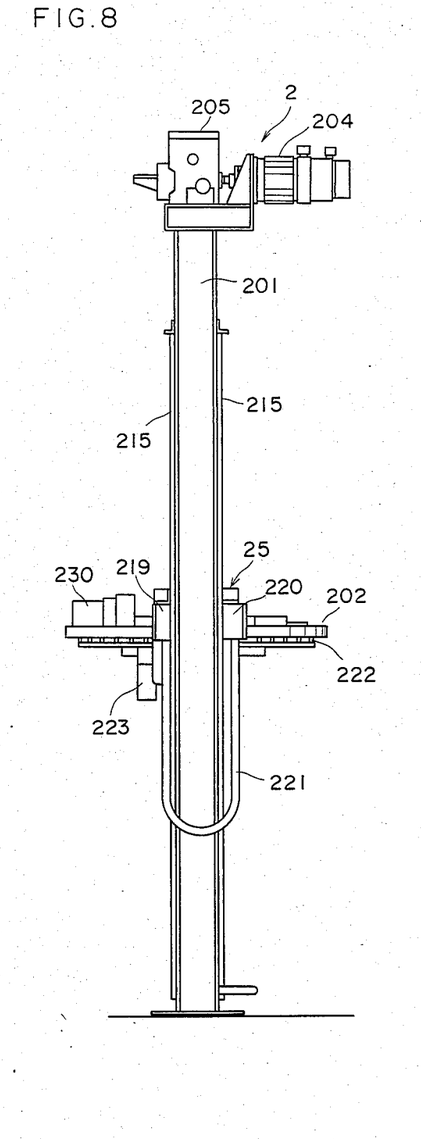
FIG. 8 is a side view of the loading/unloading machine.
Figure 9:
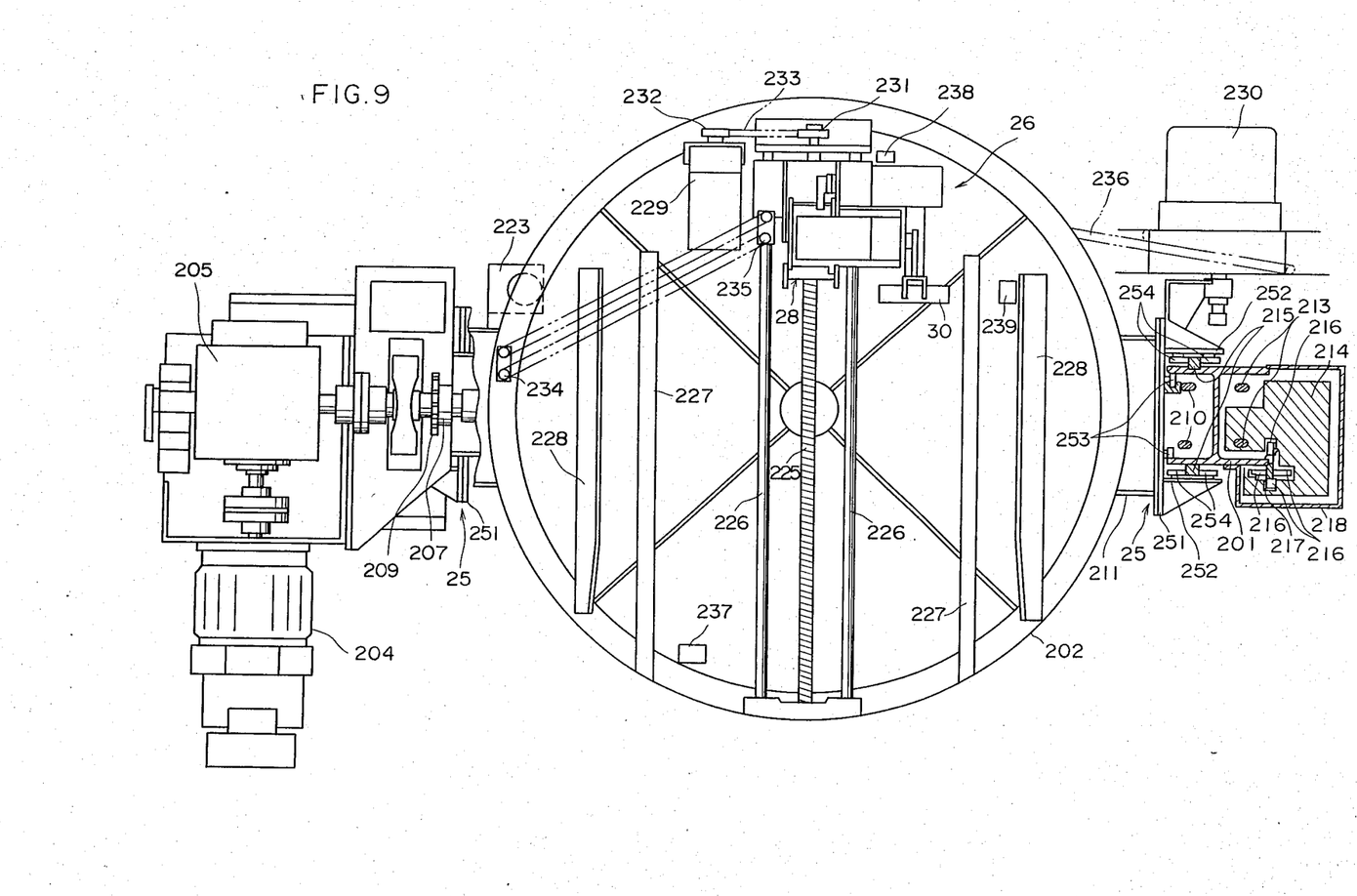
FIG. 9 is a partially cutaway enlarged plan view of the loading/unloading machine.

Referring to FIGS. 7, 8 and 9, the loading/unloading machine 2 uses a turntable 202 lifted and lowered through two guide stanchions 201,201 erected in the article storing or taking out position to thereby load onto the predetermined shelf 12 at the carrousel 1 the printer 5 as a specimen conveyed by the cart 4 with the pallet 8.

The loader/unloader 2 uses two stanchions 201,201 of an H beam shape directed at the web longitudinally and oposite to each other at a proper interval, the two stanchions 201,201 being connected at the upper ends with a connecting frame 203, thereby being gate-like shaped. A servomotor 204 for lifting or lowering the turntable 202 is mounted at the upper end of the outside flange of one stanchion 201, an output of which is transmitted through speed reduction gears 205 to a rotary shaft 206 provided above and in parallel to the connecting frame 203.

A sprocket 207 is fixed to the rotary shaft 206 at the portion thereof opposite to the inside of inner flanges of the servomotor 204 mounting stanchion 201, a sprocket 208 being fixed to the rotary shaft 206 at the portion opposite to the inside of inner flanges of the other stanchion 201, and endless chains 209 and 210 being carried across the sprockets 207 and 208 and sprockets (not shown) corresponding thereto and provided inside the lower ends of inner flanges of stanchions 201 respectively and circulating between the inner flanges at each stanchion 201. At the opposite positions at the endless chains 209 and 210 are fixed support plates 251 for carriers 25 which mount both ends of a lifting frame 211 supporting the turntable 202 and lifts or lowers along the stanchions 201 respectively, so that the rotary shaft 206 rotates to lift or lower the carriers 25,25 at equal speed while being kept level with each other.

Since the carriers 25,25 at the stanchions 201,201 are the same in construction, explanation will be given only on the carrier 25 mounted at stanchion 201 opposite to the motor 204 as shown in FIG. 9. The elongate support plate 251 opposite to the edges of inner flanges of stanchion 201 is provided with a pair of bracket members 252, 252 projecting outwardly from the support plate 251 and fitted outside of inner flanges of stanchion 201, the bracket members 252 and support plate 251 providing 12 guide rollers 253,253 and 254,254 disposed by three pairs at the upper and lower rows respectively (where the three upper guide rollers 253,254 only are shown in FIG. 9) for allowing the carriers 25 as a whole to lift and lower smoothly and without vibrations. The upper guide rollers and lower ones are disposed similarly to each other, so that explanation will be given only on the upper-three pairs of guide rollers. At the upper outside surface of support plate 251 are provided a pair of guide rollers 253,253 rolling in contact with the inner surfaces of inner flanges of stanchion 201, and the bracket members 252,252 are provided at the surfaces opposite to the stanchion 201 with pairs of guide rollers 254,254,254,254 in a manner that guide rails 215,215 provided vertically at the outside surfaces of stanchion 201 are sandwiched by the pairs of guide rollers 254 longitudinally of guide rails 215,215, the guide rollers 254,254 rolling in contact with the outside of guide rails 215,215. The three pairs of lower guide rollers are provided similarly to the above, the other carrier 25 at the other stanchion 201 also disposing 12 guide rollers similarly to the above.

A sprocket 212 is fixed to the rotary shaft 206 at the position opposite to the outside flanges at the stanchion 201 opposite to that carrying the motor 204, an endless chain 213 is carried across the sprocket 212 and a sprocket (not shown) corresponding thereto and matched therewith and provided at the lower end between the outer flanges at the stanchion 201, and a counterweight 214 is mounted at the uppermost sides of endless chain 213 when the carriers 25,25 are positioned at the lowermost side thereof so that the carriers 25,25 lift as the counterweight lowers, thereby balancing in weight with the turntable 202 to be discussed below. At the edge of one outer flange at the stanchion 201 along which the counterweight 214 lifts or lowers is mounted a guide rails 217 for guiding the counterweight 214, two pairs of guide rollers 216,216 being disposed at two vertical stages of counterweight 214 and rolling in contact with the guide rail 217 while sandwiching the rail 217 longitudinally and transversely thereof, and a cover 218 for covering the counterweight 214 being mounted vertically to the stanchion 201 in about overall length, thereby preventing the danger caused by the lifting or lowering the counterweight 214.

Referring to FIG. 8, a terminal box 219 is mounted to an intermediate portion in lengthwise of one outer flange at the stanchion 201 carrying the motor 204, and is energized through a cable (not shown) extending along the inside surface of stanchion 201 and given signals from a control unit (not shown), the motor 204 also being energized through the cable and given signals therethrough. A terminal box 220 the same as that 219 is mounted at one side surface of the carrier 25 (opposite to the terminal box 219 mounting side) lifting or lowering along the stanchion 201 carrying the terminal box 219, the terminal boxes 220 and 219 being connected by a cable (not shown) fitted into a flexible protective tube 221, so that the energization to a motor 229 for shifting forwardly or backwardly a shifting mechanism 26 fixed to the turntable 202 to be discussed below and the signal transmit-receive between a control unit and limit switches 237 and 239 to be discussed below, fixed to the turntable 202, are performed through the cable along the stanchion 201, terminal box 219, cable within the protective tube 221, terminal box 220, and a slip ring 224 to be discussed below. The length of flexible protective tube 221, in other words, the length of cable fitted into flexible protective tube 221, is about a half of moving length of the carrier 25.

The turntable 202 is provided rotatably on the lifting frame 211, is open at upper end, and increases gradually upwardly in diameter. A toothed belt 222 is wound keeping the teeth outside and around the slightly smaller diameter lower portion of turntable 202, and a turntable driving motor 223 having a gear mounted to an output shaft of motor 223 and engageable with the teeth of toothed belt 222 is mounted to the lifting frame 211 at a side of one stanchion 201, thereby the motor 223 being driven to rotate the turntable 202 as a whole at an angle of 180° normally or reversely. The slip ring 224 is provided at the center of the lower surface of turntable 202 and connected with the terminal box 220 through a cable passing through the lifting frame 211 so that the cable (not shown) for feeding power to the motor and limit switches fixed on the turntable 202, to be discussed below, is drawn onto the turntable 202. A cable reel 230 is mounted to the lifting frame 211 at the end thereof at a side of stanchion 201 providing the counterweight 214 and connected with the terminal box 220 through a cable passing within the lifting frame 211, and a cable 236 wound onto the cable reel 230 is drawn-out from the center of lowre surface of turntable 202 through the outer periphery thereof and extends across pole 234 erected on the turntable 202 and pole 235 erected at the shifting mechanism 26, thereby performing energization to a motor provided at the shifting mechanism 26 and signal transmit-receive between the limit switches provided at the shifting mechanism 26 and the control unit (not shown), thus ensuring the energization and signal transmit-receive regardless of shifting of shifting mechanism 26.

Now, referring to FIG. 9, a screw-threaded rod 225 is mounted rotatably on the upper surface of turntable 202 and extends radially thereof and passes through the center thereof, and guide shafts 226,226 are provided at both sides of screw-threaded rod 225 and in parallel thereto, pallet supports 227,227 being mounted outside the guide shafts 226 in relation of being higher at the upper surfaces than the turntable 202, in turn the guide shafts 226,226, also extend in parallel thereof respectively. Outside each pallet support 227 is provided a pallet guide 228 in parallel thereto, the pallet guide 228 comprising a strip of plate bent in a horizontal blade and a vertical inner blade and higher at the upper surface than that of pallet support 227, the pallet guides 228,228 increasing in an interval therebetween at the one ends respectively. A motor 229 for rotatably driving the screw-threaded rod 225 is mounted on the turntable 202 and in the vicinity of one end of screw-threaded rod 225, and a toothed belt 233 is stretched between a pulley 232 mounted to an output shaft of motor 229 and a pulley 231 mounted to the screw-threaded rod 225, so that the motor 229 rotates normally to rotate the rod 225 normally to thereby shift forwardly the shifting mechanism 26 and rotates reversely to shift the same backwardly.

At the screw-threaded rod 225 and guide shafts 226,226 is mounted the shifting mechanism 26 which is provided with a chucking mechanism for loading the pallet 8 carrying the printer 5 as a specimen from the chart 4 to the turntable 202 and from the turntable 202 to each shelf 12 at the carrousel 1, and with a power feeding mechanism for feeding power to the pallet 8. On the turntable 202 and between the one guide shaft 226 and the pallet support 227 is provided a limit switch 237 which is on by coming into contact properly with the shifting mechanism 26 when it shifts forwardly in the direction of mounting a chuck 28 to be discussed below. Also, on the turntable 202 and at the approximately diametrically symmetrical position with the limit switch 237 is provided a limit switch 238 which is on properly in contact with the shifting mechanism 26 when it shifts backwardly, so that the limit switches 237 and 238 are on to stop the normal or reverse rotation of motor 229. At the vicinity of one end opposite to the other end open outwardly of one pallet guide 228 (in other words, at the end in the direction of backward shifting of shifting mechanism 26) is provided with a limit switch 239 which is on in contact with the pallet 8 when loaded on the turn table 202 by means of the shifting mechanism 26.

Figure 10:
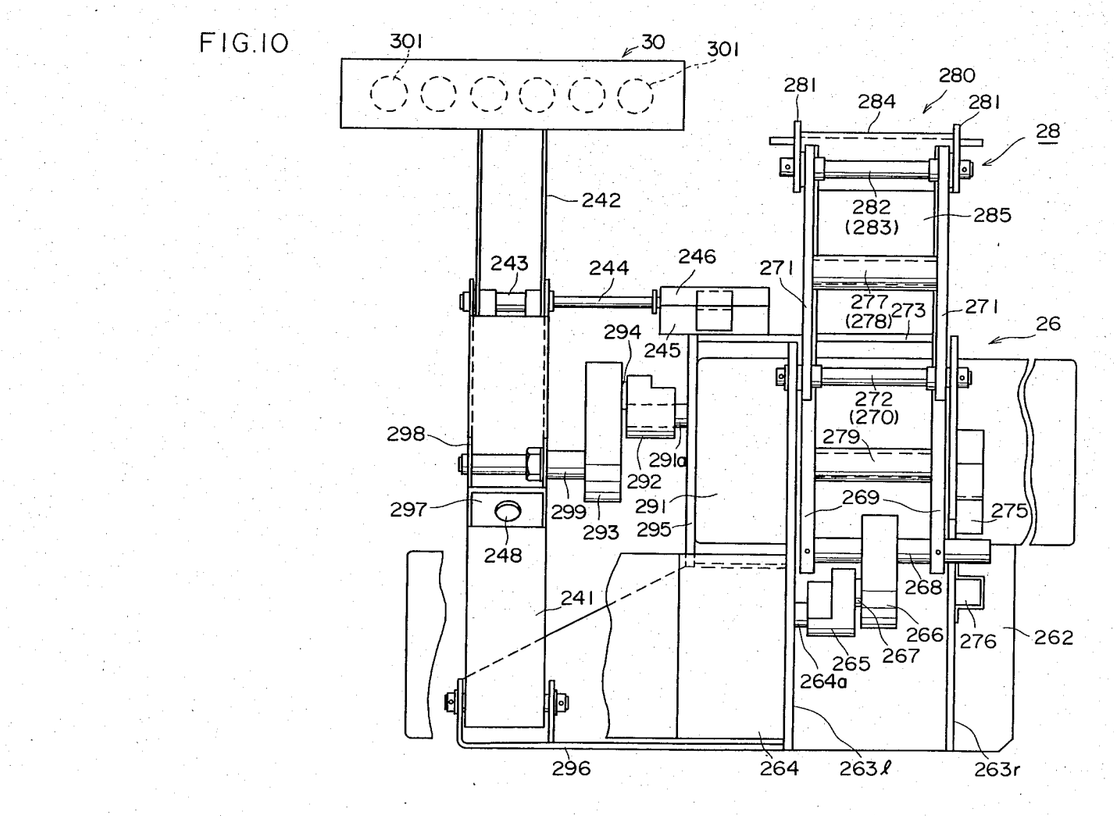
FIG. 10 is a plan view of a shifting mechanism of the invention.

FIG. 10 is a schematic plan view of shifting mechanism 26 (the left side thereof is shown in the left of the drawing, the right side in the right, the front side in the upper, and the rear side in the lower).

Figure 11:
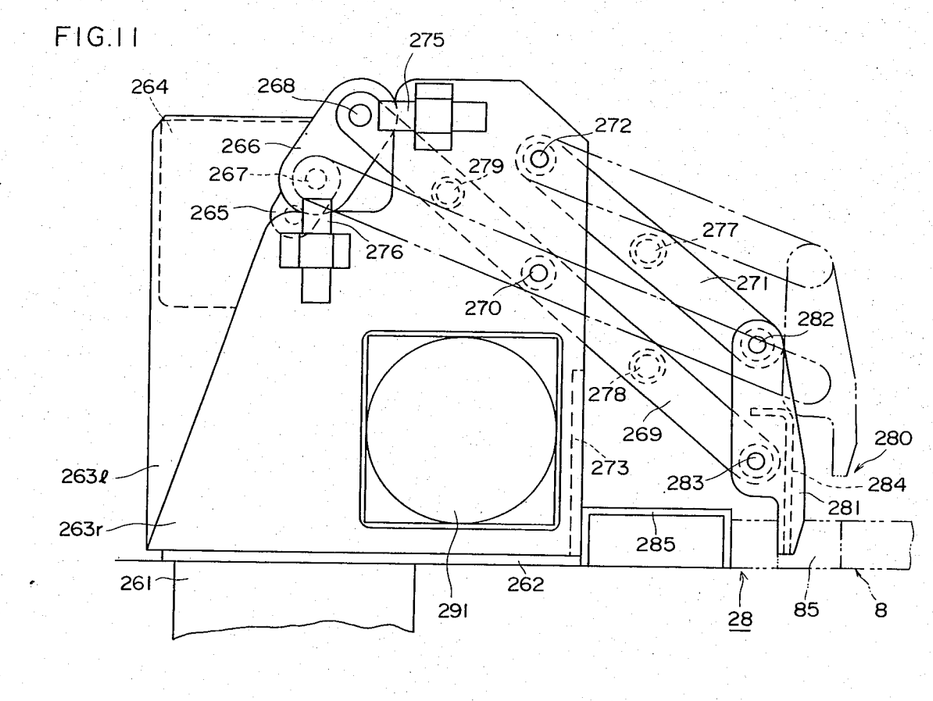
FIG. 11 is a right side view of the shifting mechanism.
Figure 12:
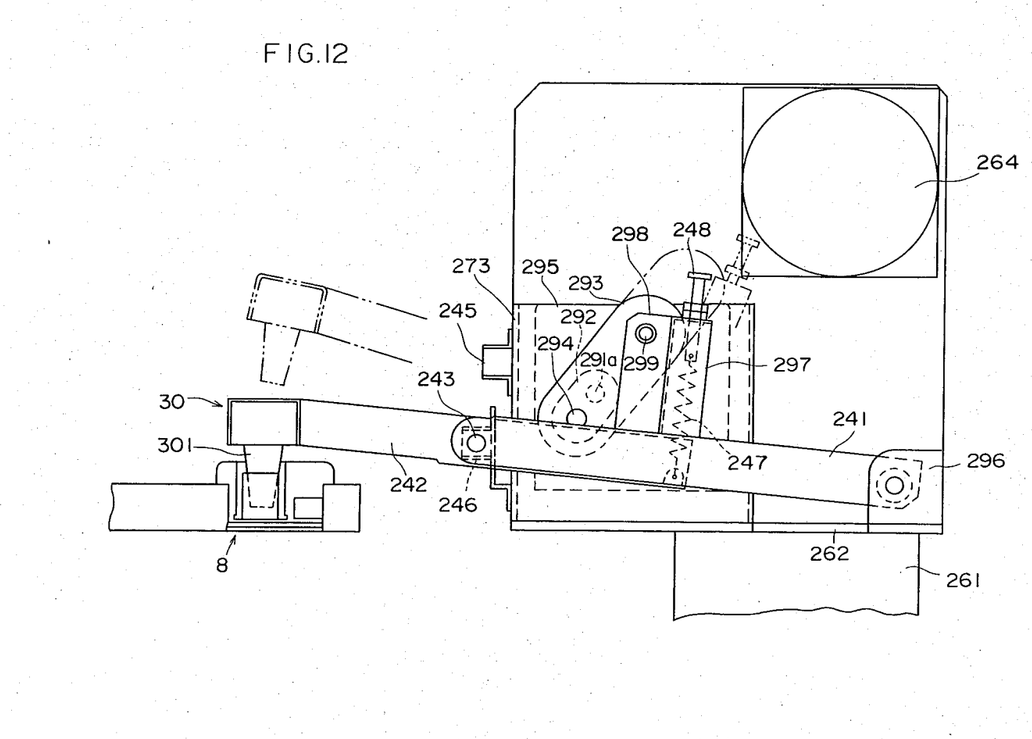
FIG. 12 is a left side view of the shifting mechanism.

FIG. 11 is a schematic right-hand side view of the shifting mechanism 26 and FIG. 12 is a schematic left-hand side view of the same. At first, explanation will be given on the chucking mechanism. Sliding blocks 261,261 are fitted slidably onto the guide shafts 226,226 respectively, a base plate 262 carrying the shifting mechanism 26 is mounted across the upper surfaces of both sliding blocks 261,261, and a nut member (not shown) screwable with the screw-threaded rod 225 is fixed to the center of lower surface of base plate 262, the screw-threaded rod 225 rotating normally or reversely to move forwardly or backwardly the base plate 262 fixed to the nut member, in turn moving the shifting mechanism 26 as a whole, along the guide shafts 226,226.

In the middle of the upper surface of base plate 262 are erected a pair of support plates 263*l* and 263*r* disposed laterally at the rearwardly upper portion of the left side surface of left-hand support plate 263*l* is fixed a motor 264 rotatably normally or backwardly for driving the chuck moving unit to be discussed below, an output shaft 264a of motor 264 projects righwardly from the left-hand support plate 263*l*, and one end of an arm 265 is fixed to the output shaft 264a and another end of that is pivoted to one end of a connecting rod 266 by a first pin 267. A second pin 268 is pivoted at its intermediate portion to the other end of connecting rod 266, and at the left end portion and right end portion of the second pin 268, a pair of first left and right link elements 269,269 extending longitudinally of shifting mechanism 26 are mounted rotatably at their rear ends respectively. The right-hand support plate 263r is cut out at the rearwardly upper portion. The right-hand end of the second pin 268 projects rightwardly from the right-hand support plate 263r through the cutout. Limit switches 275 and 276 are mounted to the right side surface of the right-hand support plate 263r in front of and below the cutout respectively, and are on when the second pin 268 reaches the upper and lower movement limits, thereby adapting the motor 264 to stop its reverse or normal rotational drive.

The first link elements 269,269 extend to keep the utmost ends in the forward downward positions, and are pivoted at the intermediate portions to the support plates 263*l* and 263*r* at the frontward intermediate portions thereof by a third pin 270 respectively. A pair of second link elements 271,271 are pivoted at their rear ends to the support plates 263*l* and 263*r* by a pin 272 vertically above the third pin 270, and extend in parallel to the first link elements 269,269 are positioned at the utmost ends vertically above those of first link elements 269,269 respectively, both the link elements 269 and 271 carrying at the utmost ends a movable member 280 for the chuck 28. The movable member 280 supports connecting elements 281,281 having pawls at the frontward lower ends, and being pivoted at the upper and lower ends rotatably to the fore ends of first and second left-hand link elements 271 and 269 and of first and second right hand ones 271 and 269 by pins 282 and 283 respectively, and has a connecting member 284 fixedly interposed between both the connecting elements 281,281, the connecting member 284 comprising an angle iron of web directed downwardly and of flange rearwardly and level at the web edge with the tips of pawls at the connecting elements 281, so that a link mechanism comprises the first and second link elements 269,269 and 271,271 and movable member 280 at the chuck 28. Between the intermediate portions between the front and rear pivot points at the second left and righthand link elements 271,271 is interposed a collar 277 for keeping a proper interval between the elements 271 and 271 and interlocking them with each other, and between the intermediate portions between the front pivot ends and the central pivot points and between the intermediate portions between the central pivot points and the rear pivot ends at the first link elements 269,269 are interposed collars 278 and 279 for keeping a proper interval between the link elements 269,269 and interlocking them. A connecting plate 273 is mounted across the frontward lower ends of support plates 263*l* and 263*r*, and supports at the front side a fixed member 285 of inverted-U-like shape in section, and extends leftwardly from the left-hand support plate 263*l*.

The chucking mechanism constructed as foregoing operates in such a manner that the motor 264 normally rotates to turn an arm 265 fixed to the output shaft 264*a* of motor 264 upwardly around the output shaft 264*a*, the connecting rod 266 revolves upwardly to turn the first link elements 269,269 clockwise in FIG. 11 around the pin 270 so that the elements 269,269 turn at the front ends rearwardly downwardly, in other words, in the direction of pulling the movable member 280 at the chuck 28, and the movable member 280 engages with a retaining bore 85 at the pallet 8 to be discussed below so that the pallet 8 as a whole is pulled leftwardly in FIG. 11, whereby the movable member 280 and fixed member 285 holds the pallet 8. When the connecting rod 266 reaches the upper limit position, in turn the lower limit of the movable member 280, the right end of pin 268 abuts against the limit switch 275 to turn it on to thereby stop the normal rotation of motor 264. Conversely, when the motor 264 reversely rotates, the arm 265 turns downwardly to turn the connecting rod 266 downwardly so that the first link elements 269,269, as shown by the alternate long and two short dashes line in FIG. 11, turn at the front ends counterclockwise in FIG. 11 around the pin 270 and the movable member 280 moves upwardly while keeping its vertical posture through the link mechanism, thereby releasing the pallet 8. When the connecting rod 266 reaches the lower limit position, in other words, when the movable member 280 reaches its upper rest position, the pin 268 contacts with the limit switch 276 to turn it on, thereby stopping the rotation of motor 264.

Next, explanation will be given on a power feeding mechanism at the shifting mechanism 26. A mounting plate 295, as shown in FIGS. 10 and 12, is erectd at the left side of left-hand support plate 263*l*. At the mounting plat 295 is mounted a geared motor 291 having its output shaft 291*a* at the left side and perforating the frontward lower portions of support plates 263*l* and 263*r*. A crank arm 292 is fixed at one end thereof to the output shaft 291*a* and pivoted at the other end to one end of a connecting rod 293 rotatably by a pin 294, the connecting rod 293 being pivoted at the another end thereof by a pin 299 to the upper portion of mounting segment 298 mounted to the front of a spring containing frame 297 erected on the upper surface of intermediate portion at a first arm 241 of inverted-U-like shape in section and extending longitudinally of shifting mechanism 26.

The first arm 241 is pivoted at its rear end to a bracket member 295 mounted onto the upper surface of base plate 262 and at the fore end to an intermediate portion of second arm 242 by a pin 243 so that the rear portion of second arm 242 insertably engages with the front portion of first arm 241. The pin 243 fixedly supports at the right end a switch dog 244 extending rightwardly. Limit switches 245 and 246 are mounted at the position on the front surface of connecting plate 273 within a moving region of switch dog 244 and corresponding to the upper and lower limits for movement of first arm 241, so that each limit switch 245 or 246 is on to stop the reverse rotation or normal rotation of motor 291.

A tension spring 247 is retained at one end to the rear end of second arm 242 to bias the front end thereof downwardly, and at the another end to the lower end of adjusting screw 248 for adjusting spring pressure, which is screwed with the upper end of spring containing frame 297 mounted onto the upper surface of first arm 241.

The second arm 242 connects at its front end with an intermediate portion of a power-feeding part 30 laterally extending. The power-feeding part 30 comprises six pole plugs 301,301 juxtaposed at the lower side of the same, the plugs 301,301 being adapted to engage with the predetermined contacts 861,861 at a power-receiving part 86 formed at the upper surface of pallet 8 to be discussed below.

The power-feeding mechanism of such construction is adapted to turn the crank arm 292 downwardly around the output shaft 291*a* by means of normal rotation of motor 291, move the connecting rod 293 downwardly, turn the first and second arms 241 and 242 downwardly around the pivoted rear end of first arm 241 to position the arms 241 and 242 as shown by the solid line in FIG. 12, and allow the plugs 301,301 at the power-receiving part 30 to engage with the contacts 861,861 at the power-receiving part 86 respectively. When the first arm 241 reaches the lower limit, the switch dog 244 contacts with the limit switch 246 to turn it on, thereby stopping the normal rotation of motor 291. At this time, if the plugs 301,301 do not reliably engage with the contacts 861,861 at the power-receiving part 86, the second arm 242 turns clockwise in FIG. 12 around the pin 243 and downwardly at the rear end against the tension spring 297, whereby there is no fear of being broken by an excessive force. Conversely, when the motor 291 reversely rotates, the crank arm 291 turns upwardly to draw the first arm 241 turns upwardly to put the second arm 242 at its front end in the position shown by the alternate long and two dashes line in FIG. 12. When the first arm 241 reaches the upper limit position, the switch dog abuts against the limit switch 245 to turn it on to thereby stop the reverse rotation of motor 291.

Figure 13:
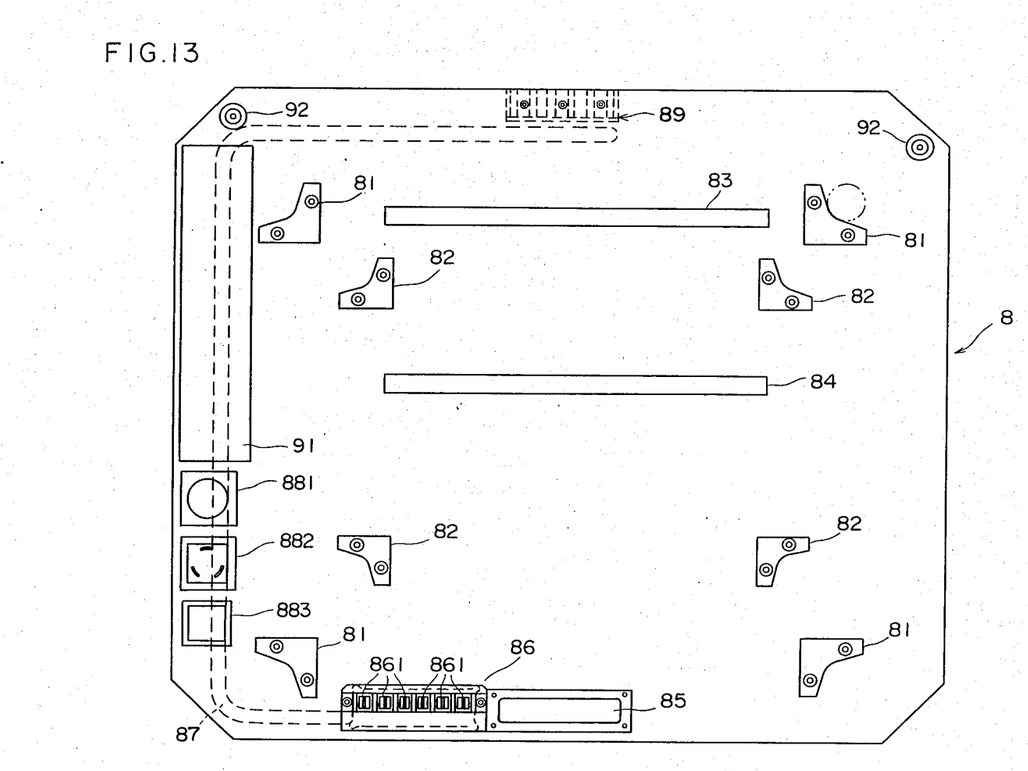
FIG. 13 is a plan view of a pallet of the invention.

FIG. 13 is a plan view of the pallet 8 used when the printer 5 as specimen is put thereon. The pallet 8 is made from plywood or snythetic resin, formed in a rectangular, about square, shape, and chamfered at four corners. Holders 81,81 for the printer legs are mounted in the vicinity of four corners at the pallet 8, and similar leg holders 82,82 are mounted inside the holders 81,81 at the same, so that a small-sized printer 5 can be put on the pallet 8. An elongate slot 83 for feeding paper to a large-sized printer 5 is bored near one major side and in parallel thereto and an elongate slot 84 is bored inwardly to slot 83 and in parallel to the major side to thereby enable feed of paper to a small-sized printer.

In proximity to the another major side and at an intermediate portion is bored a retaining bore 85 parallel to the major side, smaller in length, somewhat larger in width than the slot 83, and insertable of the lower end of movable member 280 of chuck 28 at the shifting mechanism 26 (in FIG. 13, this side represents the front side, the opposite side by the rear side, and the left-hand and right-hand sides by the left and right sides of shifting mechanism respectively).

The power-receiving part 86 laterally extending is provided leftwardly of the retaining bore 85, in which are embedded six contacts 861,861 which are furcate, close to the intermediate portions, and open upwardly, thereby being adapted to engage with the six pole plugs 301,301 at the power feeding part 30 respectively. Cables (not shown) connected to the respective contacts 861,861 pass through a guide bore 87 extending from the powerreceiving part 86 to a rear power-receiving part 89 to be discussed below along the front end face, the left-hand end face, and the rear end face. The cables are connected with three sockets 881,882 and 883 juxtaposed longitudinally of pallet 8 and at the frontward left side of the upper surface of pallet 8 above the guide bore 87. The sockets 881, 882 and 883 are connected to the one end of the cables (not shown) passing through the guide bore 87 and contacts of receiving unit 89 provided at an intermediate portion of rear end of the pallet 8 are connected to the another ends of the cables respectively, so that the cables are so connected that the respective sockets 881, 882 and 883 can supply different voltages of 320, 115 and 110V. The power-receiving part 89 comprises a recess provided at the center of rear end of pallet 8 and open rearwardly and downwardly so that six ribs having contacts at the lower end faces respectively are provided into the recess in parallel to each other laterally of pallet 8. Thus, when the pallet 8 is pushed onto the shelf 12 at the carrousel 1 the respective ribs of power-receiving part 89 at the pallet 8 are fitted between splines at the power-feeding part 127 provided at the innermost portion of the shelf 12, whereby power is supplied therefrom to the pallet 8. In FIG. 13, reference numeral 91 designates a cord housing box for the printer 5 as a specimen, and 92,92 designate legs erected at the left and right side rear portions of the upper surface of pallet 8. Two pallets 8,8, when not used, are opposite at the surfaces (the upper surface in FIG. 13) to each other and piled with pairs of legs at opposite sides of pallets 8,8, thereby being storable in a compact size. In addition, the engaging portion engageable with the movable member 280 at the chuck 28 is not limited to the retaining bore 85, but a member engageable with the movable member 280 may project from the upper surface of pallet 8.

Next, explanation will be given on operation of the automatic storing equipment of the invention constructed as abovementioned, which is controlled by a control unit (not shown). The printer 5 as a specimen of the pallet 8 is conveyed by the cart 4 to the front position of loading/unloading machine 2 and stops thereat to keep the retaining bore 85 in the loading/unloading machine 2 side. The cart 4 stops at the predetermined position, the turntable 202 on the loading/unloading machine 2 is driven by the motor 204 to be level with the surface of cart 4, the motor 229 on turntable 202 is normally rotated to normally rotate the screw-threaded rod 225, and the shifting mechanism 26 as a whole shifts forwardly with guidance by the guide shafts 226,226, at which time the movable member 280 of the chuck 28 is in its upper rest position. When the shifting mechanism 26 shifts forwardly to reach the predetermined position, the limit switch 237 in on and the motor 229 stops its rotation to stop the shifting of shifting mechanism 26.

The limit switch 237 is on to normally rotate the motor 264 at the shifting mechanism 26 so that the first and second link elements 269,269 and 271,271 turn at the utmost ends downwardly and the movable member 280 of the chuck 28 turns downwardly to engage with the retaining bore 85 at the pallet 8, so that the pallet 8 is held by the movable member 280 and fixed member 285. When the movable member 280 reaches the lower limit, the limit switch 275 is on to stop the normal rotation of motor 264.

Thereafter, the motor 291 normally rotates to turn the utmost ends of arms 241 and 242 downwardly, and the power-feeding part 30 lowers to engage the plugs 301,301 with the contacts 861,861 at the power-receiving part 86 at the pallet 8 respectively. When the utmost end of first arm 241 of the power-feeding mechanism reaches the lower limit, the limit switch 246 is on to stop the normal rotation of motor 291. In this case, if the plugs 301,301 do not engage reliably with the power-receiving part 86 at pallet 8 and the power-feeding part 30 does not lower in spite of downward movement of first arm 241, the second arm 242 turns at its rear end downwardly against the tension spring 247, whereby there is no fear of breaking the arm 242, plugs 301,301, and contacts 861,861 at the powerreceiving unit 86 of pallet 8.

In such state where the movable member 280 engages with the retaining bore 85 and each plug 301 with each contact 861, when a plug of printer 5 is plugged into one of sockets 881, 882 and 883 at the pallet 8 to apply the predetermined voltage to the printer 5 on the pallet 8 through the cable (not shown) along the stanchion 201 at the loading/unloading machine 2, terminal boxes 219 and 220, cables in the lifting frame 211, cable reel 230, cables across the poles 234 and 235, power-feeding part 30 a the shifting mechanism 26, power-receiving unit 86 at the pallet 8, and sockets 881 to 883. After the printer 5 is loaded with programs for the predetermined test operation, when the control unit assigns the printer storing shelf at the carrousel 1, the motor 229 on the turntable 202 is reversely rotated to shift backwardly the shifting mechanism 26 as a whole.

At this time, since the movable member 280 and fixed member 285 of the chuck 28 hold the pallet 8, the shifting mechanism 26 moves backwardly to draw the pallet 8 toward the turn table 202 so that the pallet 8 is loaded onto the turntable 202 guided by the pallet guides 228,228 while being kept in the predetermined posture. On the other hand, since the plugs 301,301 at the power-feeding part 30 engage reliably with the power-receiving part 86 at the pallet 8 even during the drawing of pallet 8 by the shifting mechanism 26, the printer 5 on the pallet 8 leads to ensurance of power-feeding, whereby there is no fear of erasing the loaded programs.

When the shifting mechanism 26 shifts backwardly to reach the predetermined position, the limit switch 238 is on to stop the rotation of motor 229 and stop the shifting of shifting mechanism 26, at which time the limit switch 239 provided near the pallet guide 228 abuts against the pallet 8 to thereby check that the pallet 8 is held by the chuck 28 and has been drawn in by the shifting mechanism 26. If the limit switch 239 is not on and no pallet is drawn, the shifting mechanism 26 is adapted to again shift forwardly to hold and draw the pallet 8.

The assigned shelf row 11 is circulated to the position opposite to the loading/unloading machine 2 and the limit switches 238 and 239 are on to drive the motor 223 mounted at the lifting frame 211 to thereby rotate the turntable 202 at an angle of 180°, so that the pallet 8 on the turntable 202 is opposite to the desired shelf row 11. In this case, the shifting mechanism 26 is energized through the cables across the poles 234 and 235, the cables 236 being wound on the cable reel 230, whereby upon rotating the turntable 202, the cables 236 are drawn out from the cable reel 230 to that extent. Hence, there is no fear of cutting the cable. Then, the motor 204 at the stanchion 201 normally rotates to lift the turntable 202, while being kept horizontal, to the desired shelf 12 by means of carriers 25,25, and when the turntable 202 lifts to the predetermined height, the motor 204 stops its rotation, so that the motor 229 on the turntable 202 normally rotates to shift the shifting mechanism 26 forwardly and the pallet 8 is urged thereby to move forwardly.

The pallet 8, while urging downwardly the leaf springs 129 on the tilted plates 128 mounted to the front of shelf 12, are guided by the pallet guides 126,126 and urged toward the shelf 12 keeping its predetermined posture. When the ribs at the power-receiving part 89 provided at the rear side of pallet 8 are fitted between the splines at the power-feeding part 127 at the innermost portion of shelf 12, the contacts of the power-feeding part 89 contact with the contacts of the power-feeding part 127, so that the pallet 8 is given voltage supplied to the power-feeding part 127 from the conductor rail 16 at the carrousel 1 through the current collector 17, at which time power is supplied also from the power-feeding part 30 at the shifting mechanism 26.

When the shifting mechanism 26 shifts forwardly to the predetermined position, the limit switch 237 is on, the motor 229 stops to halt the shifting mechanism 26, the motors 264 and 291 at the shifting mechanism 26 are reversely rotated to turn upwardly the movable member 280 of the chuck 28. The power-feeding part 30 turns upwardly to disengage the plugs 301,301 of the power-feeding part 30 from the contacts 861,861 at the power-receiving part 86. When the movable member 280 reaches the upper limit, the limit switch 276 is on, and when the power-feeding part 30 reaches the upper limit, the limit switch 245 is on to stop the motors 264 and 291.

At this time, since the printer 5 on the pallet 8, as abovementioned, is energized from the power-feeding part 127 at the shelf 12, the power-feeding to the printer 5 is not interrupted. Also, the pallet 8 loaded onto the shelf 12 is prevented from frontward falling by the leaf springs 129.

Both limit switches 276 and 245 are on to reversely rotate the motor 229, when the shifting mechanism 26 shifts backwardly to reach the predetermined position, the limit switch 238 is on to stop the motor 229 so that the shifting mechanism 26 stops in its position, the motor 223 is reversely rotated to reversely rotate the turntable 202 at an angle of 180°, the motor 204 at the upper portion of stanchion 201 reversely rotates to lower the turntable 202, and when the turntable 202 reaches the lowermost predetermined position, the motor 204 stops to finish the storing operation for one printer 5 and the loading/unloading machine is in standby condition.

Incidentally, the printer 5 loaded onto the predetermined shelf 12 at the movable carrousel 1 is subjected thereat to the continuous ageing test for the predetermined time.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within meets and bounds of the claims, or equivalence of such meets and bounds threof are therefore intended to be embraced by the claims.

What is claimed is:

1. An automatic storing equipment which is capable of automatically storing articles onto each shelf at a carrousel and of automatically taking out the same from each shelf, characterized by providing pallets for putting thereon said articles and having a power-feeding part to said put on article and two power-receiving parts connected with said power-feeding part, a loading/unloading machine for storing said pallets onto each shelf and taking out the same therefrom, and a carrousel means formed in multitiered and multirow construction and capable of stopping the predetermined row at the position where said loading/unloading machine is installed, each of said shelves having a power-feeding part engageable with one power-receiving part at said pallet, said loading/unloading machine being provided with: a turntable means which is capable of lifting and lowering; a shifting means provided on said turntable means and movable horizontally for storing and/or taking out said articles and having a pallet chucking mechanism, and a power-feeding mechanism engageable with another power-receiving part on said pallet, for supplying power to said another power-receiving part of said pallet for energizing said article from the time it is placed on said loading/unloading machine before storing, to the time when said article is removed from said loading/unloading machine after storing.

2. An automatic storing equipment as set forth in claim 1, wherein said pallet has a fixing member for said article put on said pallet.

3. An automatic storing equipment as set forth in claim 1, wherein said power-feeding mechanism provided on said shifting mechanism comprises an arm pivoted swingably up and downward to one end side of the shifting stroke thereof, a power-feeding part mounted to the utmost end of said arm, and a driving means for said arm.

4. An automatic storing equipment as set forth in claim 3, wherein said arm of said power-feeding mechanism is divided into two parts at a lengthwise intermediate position, and the portion at the utmost end side is connected rotatably to the portion at the pivot end side.

5. An automatic storing equipment as set forth in claim 3, wherein said shifting means is provided with two limit switches which respectively define the upper limit and lower limit positions of said arm or said power-feeding mechanism.

6. An automatic storing equipment as set forth in claim 3, wherein said power-feeding part of said power-feeding mechanism has plugs projecting downwardly and the another power-receiving part of said pallet being open upwardly so as to engage with said plugs.

7. An automatic storing equipment as set forth in claim 1, wherein said chucking mechanism of said shifting mechanism has; a chuck comprising a fixed member formed at one end side of a shifting stroke thereof and a movable member engageable with or disengageable from said fixed member; and a drive means for said movable member; said pallet having an enaging portion engageable with said movable member.

8. An automatic storing equipment as set forth in claim 7, wherein said movable member of said chuck is mounted to one end of link elements of a parallel link mechanism provided at the fixed member side with a fulcrum of rotation, and is movable vertically in parallel.

9. An automatic storing equipment as set forth in claim 7, wherein said chucking mechanism has limit switches for defining the movement limit positions of said movable member of said chuck.

10. An automatic storing equipment as set forth in claim 7, wherein the engaging portion on said pallet is an elongate slot in which said movable member of said chuck is fitted.

11. An automatic storing equipment as set forth in claim 1, wherein said turntable means on said loading-/unloading machine has limit switches for defining shifting limit positions for said shifting mechanism.

12. An automatic storing equipment as set forth in claim 1, wherein said loading/unloading machine has a counterweight balanced in weight with said turntable which is capable of lifting and lowering the position in height of said counterweight being varied according to the position of said turntable.

13. Storage apparatus for both automatically storing articles onto each shelf of a plurality of shelves of a carrousel of said apparatus, and for automatically removing the articles from the shelves, comprising:
   pallets for putting thereon said articles and having a power-feeding part to said put-on article and two power-receiving parts connected with said power-feeding part;
   a loading/unloading machine for storing said pallets onto each shelf and taking out the same therefrom;
   a carrousel means formed in multitiered and multirow construction and capable of stopping a predetermined row at the position where said loading/unloading machine is installed, each of said shelves having a power-feeding part engageable with one power-receiving part at said pallet; and
   said loading/unloading machine including:
      a turntable means which is capable of lifting and lowering said pallets;
      a shifting means provided on said turntable means and movable horizontally for storing and/or taking out said articles and having a pallet chucking mechanism, and a power-feeding mechanism is engageable with another power-receiving part on said pallet, said power-feeding mechanism including an arm pivoted swingably up and downward to one end side of a shifting stroke thereof, a power-feeding part mounted to an utmost end of said arm, and a driving means for said arm.

14. An automatic storing equipment as set forth in claim 13, wherein said arm of said power-feeding mechanism is divided into two parts at a lengthwise intermediate position, and the portion at the utmost end side is connected rotatably to the portion at the pivot end side.

15. An automatic storing equipment as set forth in claim 13, wherein said shifting means is provided with two limit switches which respectively define the upper limit and lower limit swing positions of said arm on said power-feeding mechanism.

16. An automatic storing equipment as set forth in claim 13, wherein said power-feeding part of said power-feeding mechanism has plugs projecting downwardly and the another power-receiving part of said pallet being open upwardly so as to engage with said plugs.

* * * * *